(12) United States Patent
Groenendijk et al.

(10) Patent No.: US 10,871,323 B2
(45) Date of Patent: Dec. 22, 2020

(54) METHOD OF LIQUEFYING A CO2 CONTAMINATED HYDROCARBON-CONTAINING GAS STREAM

(71) Applicant: SHELL OIL COMPANY, Houston, TX (US)

(72) Inventors: Thijs Groenendijk, Rijswjk (NL); Raimo Edwin Gregor Poorte, Rijswijk (NL); Nirupa Raghavan, Rijswijk (NL); Michiel Gijsbert Van Aken, The Hague (NL)

(73) Assignee: SHELL OIL COMPANY, Houston, TX (US)

( * ) Notice: Subject to any disclaimer, the term of this patent is extended or adjusted under 35 U.S.C. 154(b) by 179 days.

(21) Appl. No.: 15/779,634

(22) PCT Filed: Dec. 1, 2016

(86) PCT No.: PCT/EP2016/079386
§ 371 (c)(1),
(2) Date: May 29, 2018

(87) PCT Pub. No.: WO2017/093377
PCT Pub. Date: Jun. 8, 2017

(65) Prior Publication Data
US 2018/0347901 A1 Dec. 6, 2018

(30) Foreign Application Priority Data
Dec. 3, 2015 (EP) ..................... 15197898

(51) Int. Cl.
*F25J 3/06* (2006.01)
*F25J 1/00* (2006.01)
*F25J 1/02* (2006.01)

(52) U.S. Cl.
CPC ............ *F25J 3/067* (2013.01); *F25J 1/004* (2013.01); *F25J 1/0022* (2013.01); *F25J 1/0035* (2013.01);
(Continued)

(58) Field of Classification Search
CPC ...... F25J 1/0035; F25J 1/0202; F25J 2205/10; F25J 2205/20; F25J 2220/66; F25J 3/061; F25J 3/067; Y10S 62/929; Y02C 10/12
See application file for complete search history.

(56) References Cited

U.S. PATENT DOCUMENTS 3,376,709 A * 4/1968 Dickey .................. C07C 7/14
62/637
6,564,578 B1   5/2003 Fischer-Calderon
(Continued)

FOREIGN PATENT DOCUMENTS

CN    201028930 Y    2/2008
CN    101421574 A    4/2009
(Continued)

OTHER PUBLICATIONS

International Search Report and Written Opinion received for PCT Patent Application No. PCT/EP2016/079386, dated Mar. 1, 2017, 8 pages.
(Continued)

*Primary Examiner* — Marc E Norman

(57) ABSTRACT

The present invention provides a method of liquefying a contaminated hydrocarbon-containing gas stream: (a) providing a CO2 contaminated hydrocarbon-containing gas stream (20); (b) cooling the contaminated hydrocarbon-containing gas stream to obtain a partially liquefied stream (70); (c) separating the partially liquefied stream obtaining a liquid stream (90); (d) cooling the liquid stream (90) in a direct contact heat exchanger (200) obtaining a multiphase
(Continued)

Figure 1A:
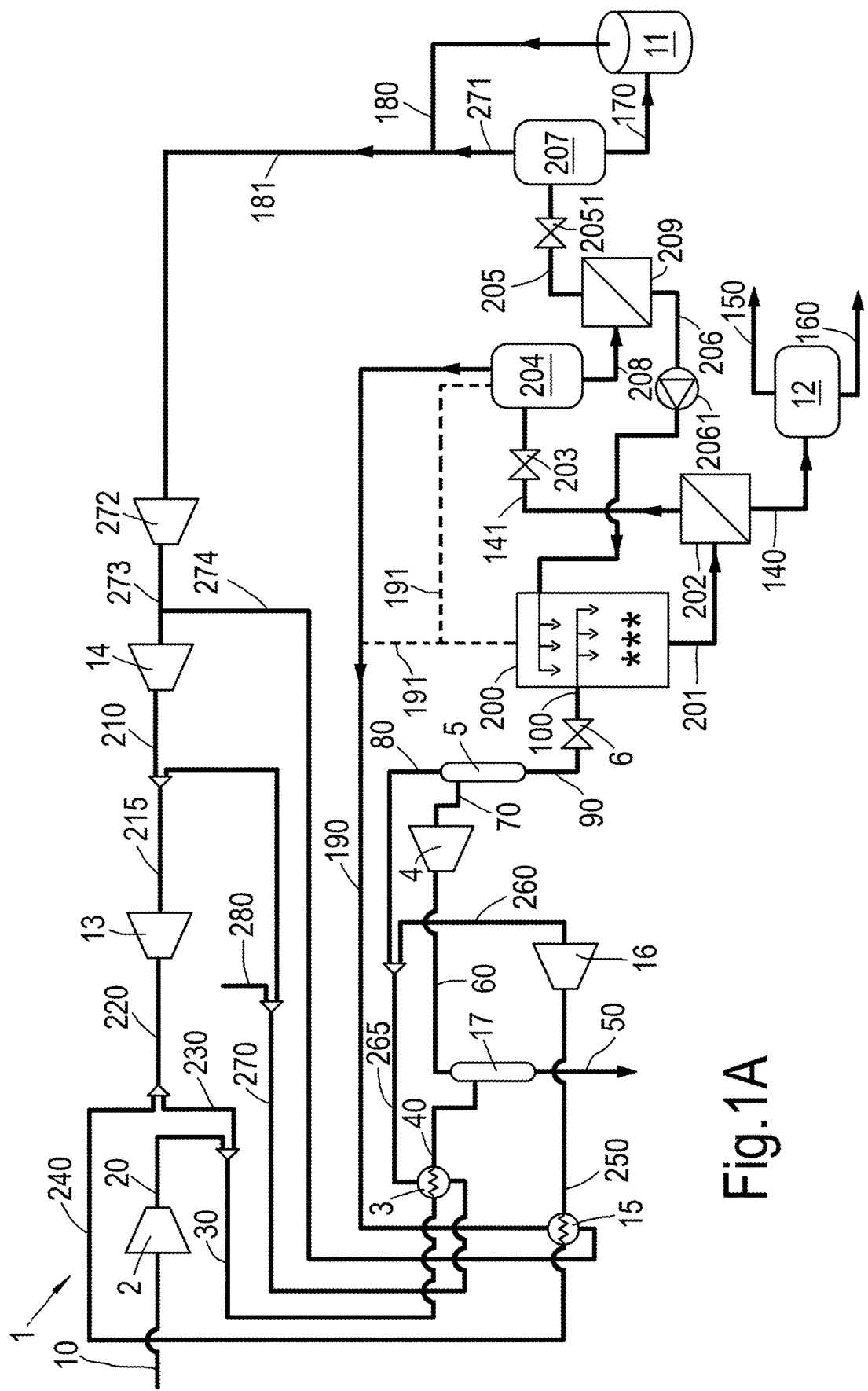

stream (201) containing at least a liquid phase and a solid CO2 phase; (e) separating the multiphase stream in a solid-liquid separator (202) obtaining a CO2 depleted liquid stream (141); (f) passing the CO2 depleted liquid stream (141) to a further cooling, pressure reduction and separation stage to generate a further CO2 enriched slurry stream (206); (g) passing at least part of the further CO2 enriched slurry stream (206) to the direct contact heat exchanger (200) to provide cooling duty to and mix with the liquid stream (90).

16 Claims, 4 Drawing Sheets

(52) U.S. Cl.
CPC ............ *F25J 1/0037* (2013.01); *F25J 1/021* (2013.01); *F25J 1/0202* (2013.01); *F25J 1/0209* (2013.01); *F25J 3/061* (2013.01); *F25J 3/0635* (2013.01); *F25J 2205/10* (2013.01); *F25J 2205/20* (2013.01); *F25J 2205/30* (2013.01); *F25J 2205/90* (2013.01); *F25J 2210/04* (2013.01); *F25J 2215/04* (2013.01); *F25J 2220/66* (2013.01); *F25J 2230/30* (2013.01); *F25J 2230/60* (2013.01); *F25J 2235/60* (2013.01); *F25J 2235/80* (2013.01); *F25J 2240/02* (2013.01); *F25J 2245/02* (2013.01); *F25J 2245/90* (2013.01); *F25J 2270/04* (2013.01); *F25J 2270/88* (2013.01); *Y02C 20/40* (2020.08)

(56) References Cited

U.S. PATENT DOCUMENTS

| | | | |
|---|---|---|---|
| 7,325,415 B2* | 2/2008 | Amin | B01D 21/2455 62/532 |
| 2002/0174678 A1 | 11/2002 | Wilding et al. | |
| 2003/0089125 A1* | 5/2003 | Fredheim | F25J 1/0231 62/612 |
| 2004/0187686 A1* | 9/2004 | Amin | F25J 3/0635 95/228 |
| 2006/0213222 A1 | 9/2006 | Whitesell | |
| 2009/0241593 A1 | 10/2009 | Jager et al. | |
| 2011/0094263 A1 | 4/2011 | Wilding et al. | |
| 2013/0340475 A1 | 12/2013 | Turner et al. | |
| 2015/0159946 A1* | 6/2015 | Valencia | C10L 3/101 62/625 |
| 2016/0116210 A1* | 4/2016 | Denton | F25J 3/067 62/628 |

FOREIGN PATENT DOCUMENTS

| | | | | |
|---|---|---|---|---|
| EP | 2789957 A1 * | 10/2014 | | F25J 1/0202 |
| WO | 03062725 A1 | 7/2003 | | |
| WO | 2010023238 A1 | 3/2010 | | |
| WO | 2010079175 A2 | 7/2010 | | |
| WO | 2012068588 A1 | 5/2012 | | |
| WO | 2012162690 A2 | 11/2012 | | |
| WO | 2014058648 A1 | 4/2014 | | |
| WO | 2014166925 A2 | 10/2014 | | |
| WO | 2015017357 A1 | 2/2015 | | |

OTHER PUBLICATIONS

International Search Report and Written Opinion received for PCT Patent Application No. PCT/EP2016/079403, dated Mar. 3, 2017, 10 pages.
International Search Report and Written Opinion received for PCT Patent Application No. PCT/EP2014/057007, dated Dec. 15, 2014, 9 pages.
International Search Report and Written Opinion received for PCT Patent Application No. PCT/EP2016/079392, dated Mar. 16, 2017, 9 pages.
Price, "Small-Scale LNG Facility Development", Hydrocarbon Processing, Jan. 1, 2003, vol. 82, Issue No. 1, pp. 37-39.

* cited by examiner

METHOD OF LIQUEFYING A CO2 CONTAMINATED HYDROCARBON-CONTAINING GAS STREAM

PRIORITY CLAIM

The present application is the National Stage (§ 371) of International Application No. PCT/EP2016/079386, filed Dec. 1, 2016, which claims priority from European Application No. 15197898.8, filed Dec. 3, 2015 incorporated herein by reference.

The present invention relates to a method of liquefying a contaminated hydrocarbon-containing gas stream, the contaminant being CO2.

Methods of liquefying hydrocarbon-containing gas streams are well known in the art. It is desirable to liquefy a hydrocarbon-containing gas stream such as natural gas stream for a number of reasons. As an example, natural gas can be stored and transported over long distances more readily as a liquid than in gaseous form, because it occupies a smaller volume and does not need to be stored at high pressures. Typically, before being liquefied, the contaminated hydrocarbon-containing gas stream is treated to remove one or more contaminants (such as $H_2O$, $CO_2$, $H_2S$ and the like) which may freeze out during the liquefaction process.

WO2014/166925 describes a method of liquefying a contaminated hydrocarbon-containing gas stream, the method comprising at least the steps of:

(1) providing a contaminated hydrocarbon-containing gas stream;

(2) cooling the contaminated hydrocarbon-containing gas stream in a first heat exchanger thereby obtaining a cooled contaminated hydrocarbon-containing stream;

(3) cooling the cooled contaminated hydrocarbon-containing stream in an expander thereby obtaining a partially liquefied stream;

(4) separating the partially liquefied stream in a separator thereby obtaining a gaseous stream and a liquid stream;

(5) expanding the liquid steam obtained in step (4) thereby obtaining a multiphase stream, the multiphase stream containing at least a vapour phase, a liquid phase and a solid phase;

(6) separating the multiphase stream in a separator thereby obtaining a gaseous stream and a slurry stream (comprising solid CO2 and liquid hydrocarbons);

(7) separating the slurry stream in a solid/liquid separator thereby obtaining a liquid hydrocarbon stream and a concentrated slurry stream;

(8) passing the gaseous stream obtained in step (4) through the first heat exchanger thereby obtaining a heated gaseous stream; and (9) compressing the heated gaseous stream thereby obtaining a compressed gas stream; and

(10) combining the compressed gas stream obtained in step (9) with the contaminated hydrocarbon-containing gas stream provided in step (1).

The method as described in WO2014/166925 allows liquefying a contaminated hydrocarbon-containing gas stream with a relatively low equipment count, thereby providing a simple and cost-effective method of liquefying a contaminated hydrocarbon-containing gas stream, in particular a methane-containing contaminated gas stream such as natural gas. The contaminant may be CO2.

The method according to WO2014/166925 uses a freeze out process scheme to remove CO2. In step (5) as described above, the process conditions in the liquid stream obtained in step (4) are just outside the CO2 freeze out envelope (the process conditions are for example 20 bar, −120° C., 1 mol % CO2) such that any further temperature reduction will provoke freeze out of CO2. The temperature reduction is achieved in step (5) by pressure reduction over a Joule Thomson valve. The pressure reduction evaporates part of the liquid methane, thus cooling the remaining liquid.

The use of a Joule Thomson valve has a couple of drawbacks.

In the first place, the residence time of the molecules in the Joule Thomson is very short (<1 ms) and hence there is very little time for CO2 crystal growth. Secondly, only a modest subcooling below CO2 freeze out temperature is obtained, typically in the range of 1-10° C. which creates a modest driving force for CO2 crystallization.

Thirdly, a Joule Thomson valve does not give independent control of pressure and temperature, as the downstream temperature follows from the downstream pressure.

Furthermore, the flashing of the liquid stream over the Joule Thomson valve creates a multiphase mixture of mainly vapour, some liquid, and a small amount of solid, where the presence of the abundant vapour phase mixes the liquid phase, thereby disturbing the growing process of CO2 crystals, as the mixing may cause break-up of solids.

Also, the Joule Thomson valve will generate a relatively large shearing force on the liquid stream. This shearing force, exerted in the narrow clearance of the Joule Thomson valve tends to disrupt CO2 particles and thus disturb formation and/or growth of CO2 particles.

All the above mentioned drawbacks contribute to relatively small CO2 particles being formed. Typically, the solid CO2 particles have a size smaller than 20 micron ($<20*10^{-6}$ meter).

Small CO2 particles are relatively difficult to separate from liquid hydrocarbons, which could result in solid CO2 residue in the product LNG.

WO2015017357 describes a process and system for production of liquefied natural gas (LNG) from natural gas. The natural gas is first partially purified by removal of water and other contaminants, followed by partial chilling to freeze some contaminants and to allow for production of a purge stream to remove other contaminants. These contaminants may be removed from the stream.

This process provokes freeze out at a single temperature level by isobaric cooling in a quench tower; any further freeze out due to isobaric cooling in a chiller is however not separated from the LNG product. Solids formed in the chiller may over time block the flow path, thus making the process difficult to operate.

WO2012068588 describes a system and method for separating condensable vapors from gases by direct-contact heat exchange. Condensable vapors such as carbon dioxide are separated from light gases in a process stream. The systems and methods employ a direct exchange heat exchanger to desublimate the condensable vapors from the process stream. The condensable vapors are condensed by directly contacting a heat exchange liquid in the direct contact heat exchanger while the uncondensed light gases from the process stream form a separated light gas stream. The separated light-gas stream can be used in a recuperative heat exchanger cool the process stream.

WO2012068588 introduces the need of a separate, non-volatile heat exchange liquid (such as methyl cyclopentane) and is therefore not suitable to be used in a method of liquefying a hydrocarbon-containing gas, i.e. producing LNG), as this separate foreign heat exchange liquid would contaminate the LNG.

WO2012162690 describes a method and system to separate condensable vapors such as carbon dioxide from light gases or liquids in a mixed process stream. The separation is carried out in a cryogenic process using one or more external cooling loops (ECLs) that first cool down a mixed process stream containing condensable vapors and light gases or liquids, causing the condensable vapors to desublimate and form solids. Next, the solids are separated from the light gases or liquids, forming a solid stream and a light gas or liquid stream. Then the refrigerants of the ECL are cooled by warming the separated solid stream and light gas or liquid stream, efficiently recovering energy used in cooling and desublimating the condensable vapors.

WO2012068588 and WO2012162690 are not suitable for use in method of liquefying a hydrocarbon stream to produce LNG.

It is an object of the present invention to solve or at least minimize the above problems identified with respect to WO2014/166925.

It is a further object of the present invention to provide a simpler and more cost-effective method of liquefying a contaminated hydrocarbon-containing gas stream, in particular a methane-containing contaminated gas stream such as natural gas.

According to an embodiment there is provided a method of liquefying a contaminated hydrocarbon-containing gas stream, the method comprising at least the steps of:
(a) providing a contaminated hydrocarbon-containing gas stream (20), the contaminant being CO2;
(b) cooling the contaminated hydrocarbon-containing gas stream (20) to obtain a partially liquefied stream (70);
(c) separating the partially liquefied stream (70) in a separator (5) thereby obtaining a gaseous stream (80) and a liquid stream (90);
(d) cooling the liquid stream (90) obtained in step (c) by passing the liquid stream (90) to a direct contact heat exchanger (200) thereby obtaining a multiphase stream (201), the multiphase stream (201) containing at least a liquid phase and a solid phase, the solid phase containing CO2 particles;
(e) separating the multiphase stream (201) in a solid-liquid separator (202) thereby obtaining a CO2 depleted liquid stream (141) and a CO2 enriched slurry stream (140);
(f) passing the CO2 depleted liquid stream (141) to a further cooling, pressure reduction and separation stage, the further cooling, pressure reduction and separation stage generating a gaseous stream (190), a purified liquid stream (205) and a further CO2 enriched slurry stream (206);
(g) passing at least part of the further CO2 enriched slurry stream (206) to the direct contact heat exchanger (200) to provide cooling duty to and mix with the liquid stream (90) obtained in step (c).

The further CO2 enriched slurry stream 206 preferably comprises solid CO2 particles on which dissolved CO2 can freeze out. This results in larger CO2 particles being formed in the direct contact heat exchanger (200).

According to an embodiment there is provided a system for liquefying a contaminated hydrocarbon-containing gas stream, the system comprising:
(a) a feed conduit (20) arranged to provide a contaminated hydrocarbon-containing gas stream (20), the contaminant being CO2;
(b) a cooling and expansion stage (3, 4) arranged to receive the contaminated hydrocarbon-containing gas stream (20) and discharge a partially liquefied stream (70);
(c) a separator (5) arranged to receive the partially liquefied stream (70) and to discharge a gaseous stream (80) and a liquid stream (90);
(d) a direct contact heat exchanger (200) arranged to receive and cool the liquid stream (90) obtained in step (c) to obtain a multiphase stream (201), the multiphase stream (201) containing at least a liquid phase and a solid phase, the solid phase containing CO2 particles;
(e) a solid-liquid separator (202) arranged to receive the multiphase stream (201) and discharge a CO2 depleted liquid stream (141) and a CO2 enriched slurry stream (140);
(f) a further cooling, pressure reduction and separation stage arranged to receive the CO2 depleted liquid stream (141) and generate a gaseous stream (190), a purified liquid stream (205) and a further CO2 enriched slurry stream (206);
(g) a recycle conduit (206) which is arranged to pass at least part of the further CO2 enriched slurry stream (206) comprising solid CO2 particles to the direct contact heat exchanger (200).

This recycle conduit is arranged to provide solid CO2 particles to the direct contact heat exchanger 200 on which dissolved CO2 can freeze out thus forming larger CO2 particles, as well as to provide cooling duty to and mix with the liquid stream (90) obtained in step (c).

The method and the system as described above and described below with reference to the embodiments, preferably don't use a separate refrigerant being circulated in a separate refrigerant cycle. The contaminated hydrocarbon-containing gas stream 20 is preferably cooled by expansion-cooling and by cooling in a heat exchanger against a refrigerant stream that is formed from the hydrocarbon-containing gas stream 20 itself.

Figure 1B:
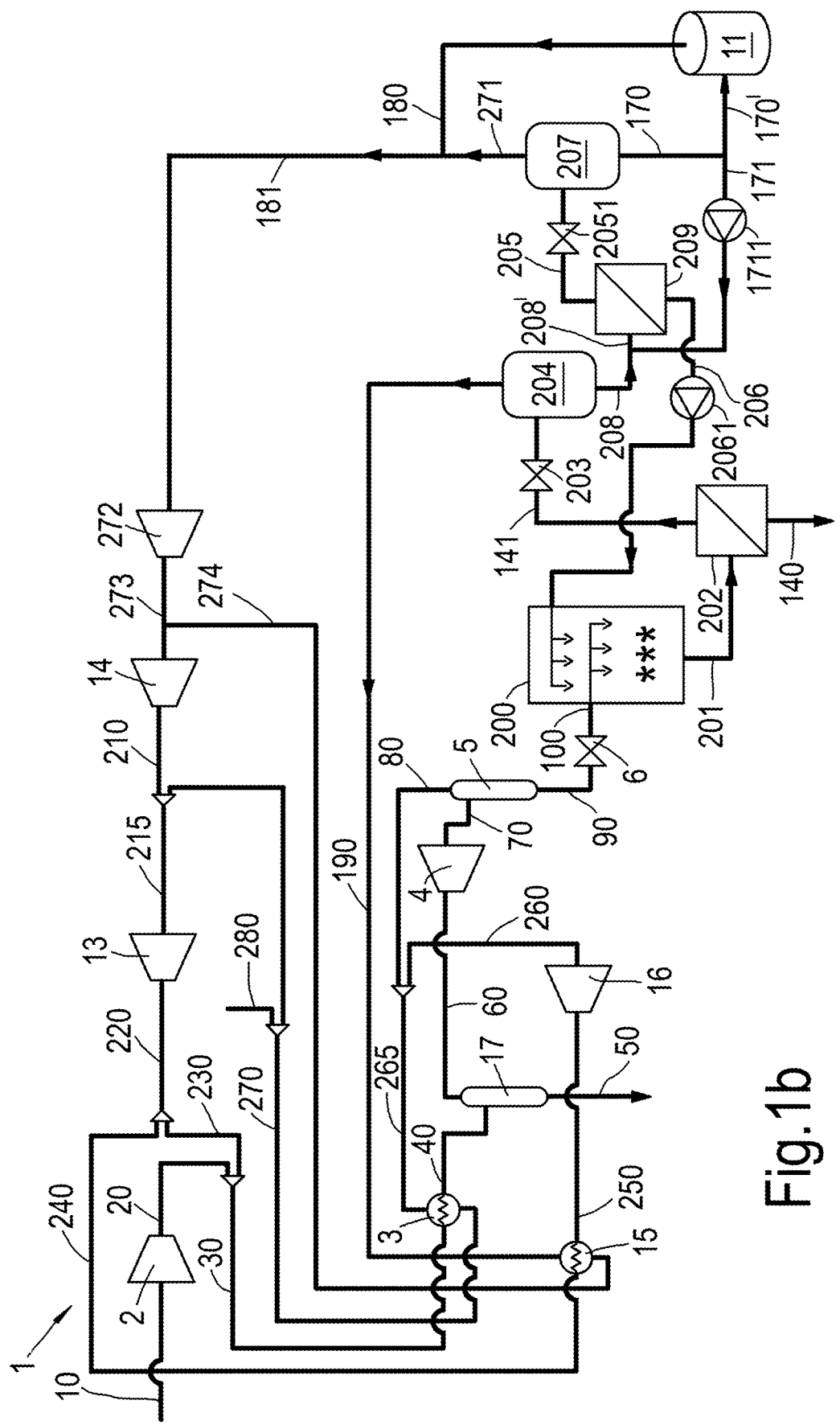
Figure 1C:
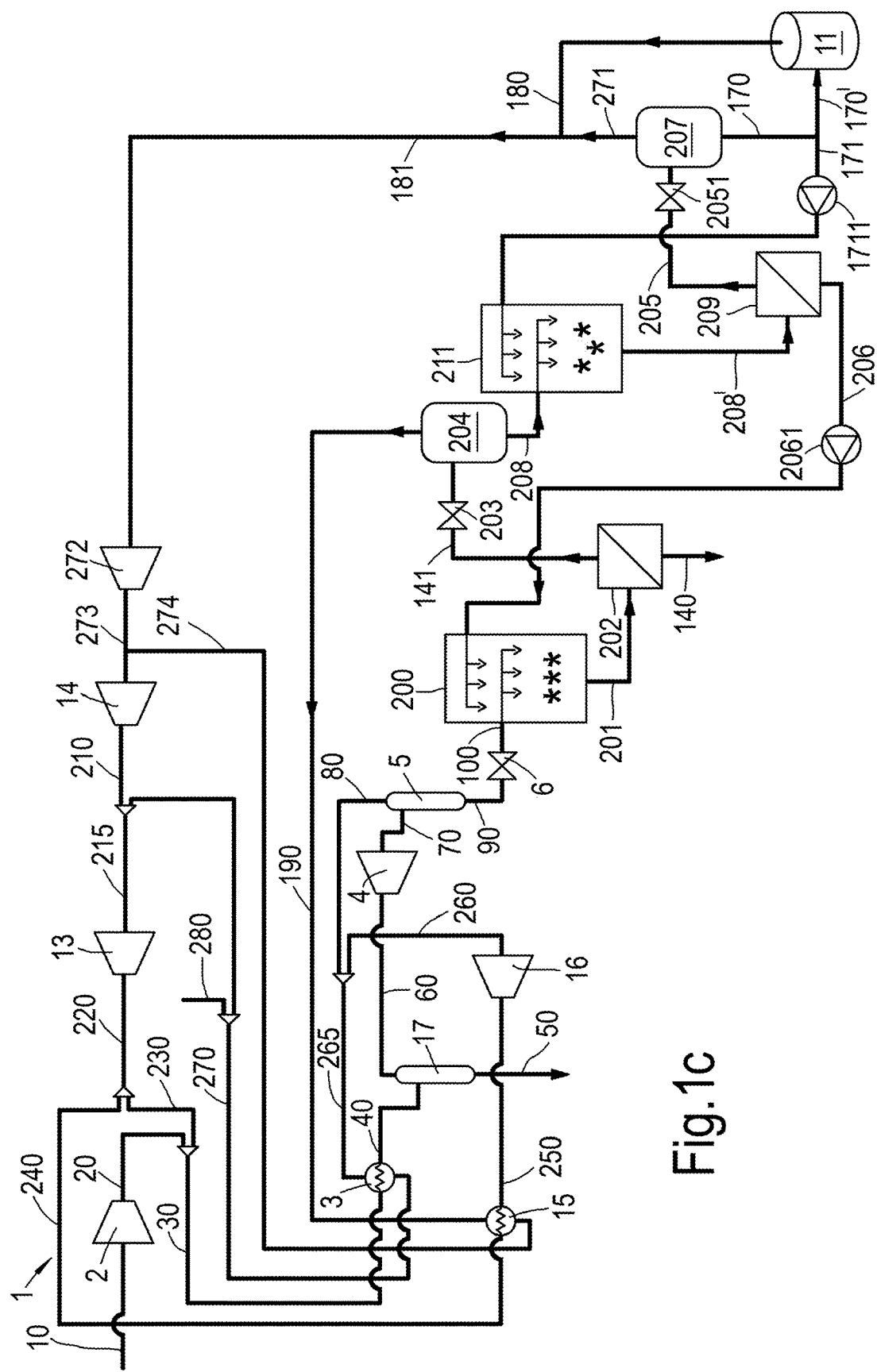
Figure 2:
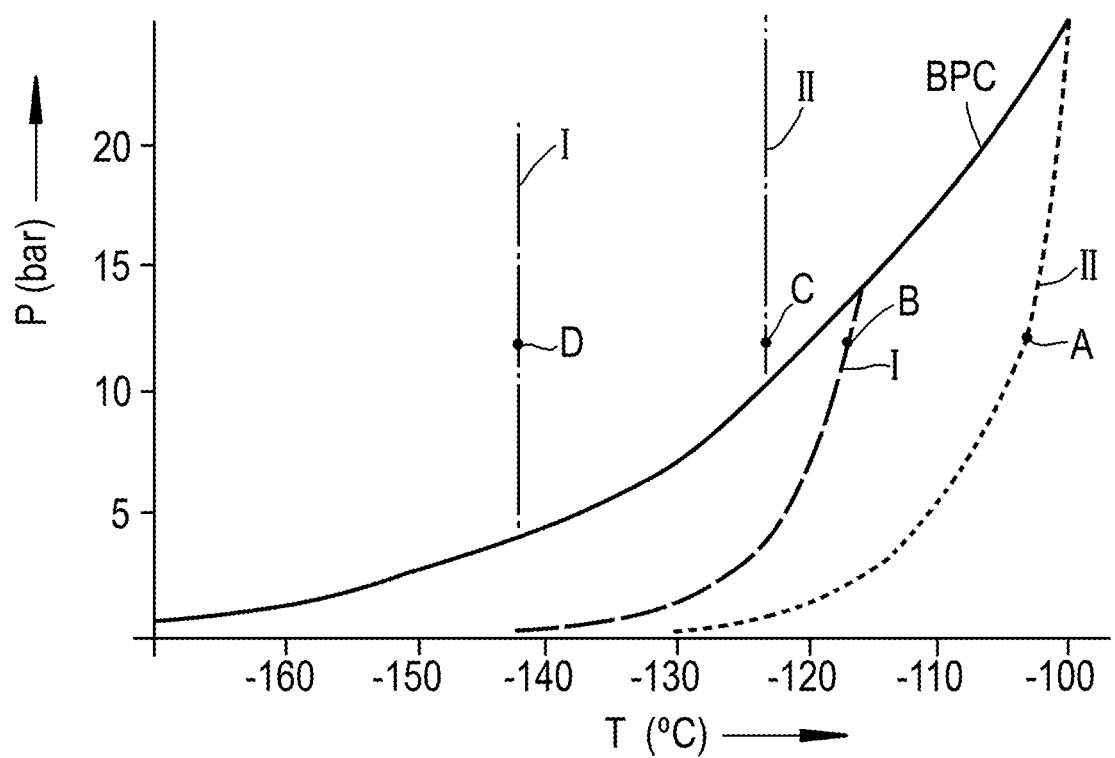

Hereinafter the invention will be further illustrated by the following non-limiting drawing. Herein shows:

FIG. 1a-c schematically show different process schemes for performing the method according to different embodiments, and FIG. 2 schematically depicts a frost line diagram for a binary mixture of CO2 and methane.

For the purpose of this description, reference numbers refer to the stream as well as to the conduit carrying this stream.

FIGS. 1a-1c schematically show a system or process scheme for performing a method of liquefying a contaminated hydrocarbon-containing gas stream. The system is generally referred to with reference number 1.

The process scheme 1 as shown in FIG. 1a comprises a compressor 2, a heat exchanger 3 ("the first heat exchanger"), an expander 4, a first separator 5, a JT-valve 6, a direct contact heat exchanger 200, a solid-liquid separator 202, a (Joule Thomson) valve 203, separator 204, a further solid-liquid separator 209, an end flash vessel 207, a second heat exchanger 15, an expander 16 and optionally a methanol separator 17. The process scheme may further comprise additional hardware such as for instance further heat exchangers in addition to the first heat exchanger 3 and second heat exchanger 15. Preferably, the first heat exchanger 3 and second heat exchanger 15 are separate heat exchangers.

During use of the process scheme 1, a contaminated hydrocarbon-containing gas stream 20 is provided (which has previously been compressed as stream 10 in compressor 2). This relates to step (a) as described above.

Upstream of compressor 2 gas treating may have taken place, such as the removal of water, removal of heavy hydrocarbons (heptane and heavier), removal of H2S.

The contaminated hydrocarbon-containing gas stream 20 is typically a natural gas stream. The contaminated hydrocarbon stream 20 typically has a pressure in the range of 40 to 120 bar and is at a temperature in the range of −30 to 30° C. The contaminated hydrocarbon-containing gas stream 20 comprises at least 50 vol. % methane, preferably at least 80 vol. %.

In a next step (b) the contaminated hydrocarbon-containing gas stream 20 is cooled to obtain a partially liquefied stream 70. As indicated above, this is preferably done without the use of separate refrigerant cycles, but is preferably done by cooling against part of the stream 10 or contaminated hydrocarbon-containing gas stream 20 obtained as part of the process scheme or method.

According to an embodiment step (b) comprises (b1) cooling the contaminated hydrocarbon-containing gas stream 20 in a first heat exchanger 3 thereby obtaining a cooled contaminated hydrocarbon-containing stream 40;

(b2) cooling the cooled contaminated hydrocarbon-containing stream 40, 60 in an expander 4 thereby obtaining the partially liquefied stream 70.

The cooled contaminated hydrocarbon-containing stream 40 obtained in step (b1) typically has a temperature of at most −40° C., preferably at most −50° C., more preferably at most −60° C.

The first heat exchanger 3 is (like the second heat exchanger 15) an indirect heat exchanger; hence no direct contact between the streams takes place, but only heat exchanging contact.

As shown in the embodiments shown in FIG. 1*a-c*, the cooled contaminated hydrocarbon-containing stream 40 is optionally passed to the methanol separator 17 to separate methanol (as stream 50) that has been previously injected (e.g. into stream 20) to prevent hydrate formation.

After the methanol separator 17, the (methanol-depleted) cooled contaminated hydrocarbon-containing gas stream is further cooled as stream 60 in the expander 4 thereby obtaining the partially liquefied stream 70 (step b2). This partially liquefied stream 70 is separated in separator 5 thereby obtaining a gaseous stream 80 and a liquid stream 90 (step c).

The separator 5 may be operated just above the CO2 frost line, e.g. at 20 bar and minus 120° C. for a stream with 1.0 mol % CO2.

As shown in the figures, the liquid steam 90 may be expanded in JT-valve 6 thereby obtaining a multiphase stream 100.

So, according to an embodiment passing the liquid stream 90 obtained in step (c) to a direct contact heat exchanger 200 comprises passing the liquid stream 90 over a pressure reduction device. The pressure reduction device may be a (Joule Thomson) valve 6. The pressure reduction valve partially flashes the liquid stream 90 and thereby cools the remaining liquid phase to obtain a multiphase stream comprising liquid, vapour and possibly solids.

The multiphase stream 100 may comprise a CO2 fraction in the range of 0.001 mol %-10 mol % CO2.

The liquid stream 90 obtained in step (c) typically has a pressure in the range of 12-30 bar, for instance 15-25 bar. The pressure reduction device 6 typically creates a pressure drop of 1-20 bar. The pressure of the multiphase stream 100 downstream of the pressure reduction device is typically in the range of 4-29 bar, e.g. in the range of 10-24 bar.

The multiphase stream 100 may have a temperature in the range of −100° C. to −130° C.

The contaminated hydrocarbon-containing stream 20 is thus first cooled in a heat exchanger 3 and by means of an expander 4 (steps b1 and b2). The stream is then separated (step c) and optionally further cooled by flashing over a pressure reduction device 6.

The resulting cooled contaminated hydrocarbon-containing stream is, in step (d), further cooled in a direct contact heat exchanger 200 thereby obtaining a multiphase stream 201. The multiphase stream 201 contains at least a liquid phase and a solid phase, the solid phase containing CO2 particles.

FIG. 2 schematically depicts the phase behaviour of a binary mixture of CO2 and CH4. Two frost lines are indicated (dashed lines I and II) and the bubble point curve is indicated by the solid line.

Frost line I corresponds to a binary mixture of 0.2 mol % CO2 and 99.8 mol % CH4. Frost line II corresponds to a binary mixture of 1 mol % CO2 and 99 mol % CH4. Above the bubble point curve, there is a liquid phase, but no vapor phase.

Whether solid CO2 is present depends on pressure, temperature and CO2 concentration. Consider point D, located on the CO2 frost line for 0.2 mol % CO2. If the CO2 concentration exceeds 0.2 mol % at the pressure and temperature conditions of point D, there is a solid CO2 phase and there is a liquid phase composed of CH4 and CO2.

The CO2 frost lines are discontinuous at the bubble point curve (as can be seen from points B and D that are both on the frost line for 0.2 mol % CO2, and from points A and C that are both on the frost line for 1.0 mol % CO2).

The CO2 freeze out temperature for point D (that is located above the bubble point curve, hence in the liquid/solid region of the phase envelope) is 25 degree Celcius lower than the freeze out temperature at point B (that is located below the bubble point curve, hence in the vapor/liquid/solid region of the phase envelope).

This phase behaviour is exploited in the embodiments. As an example, by operating the freeze out separation process at the pressure and temperature conditions of point B, the same amount of CO2 is removed as for a process that operates at the pressure and temperature conditions of point D.

According to an embodiment the combination of the pressure and temperature in the direct contact heat exchanger 200 is controlled to be below the bubble point curve for the relevant CO2 mol fraction in a pressure vs. temperature diagram (for instance point A or B in FIG. 2), corresponding to the vapour, liquid and solid region of the phase envelope.

As can be seen in FIG. 2, the CO2 freeze out temperature for point D (that is located above the bubble point curve, hence in the liquid/solid region of the phase envelope) is lower (approximately 25° C.) than the freeze out temperature at point B (that is located below the bubble point curve, hence in the vapor/liquid/solid region of the phase envelope).

Below the bubble point curve, a thermodynamic freeze out process will take place that freezes at least some of the liquid CO2 into solid CO2, and at least some of the gaseous CO2 into solid CO2 particles. The temperature conditions in direct contact heat exchanger 200 (at any given operating pressure), can be controlled by controlling the flow rate and/or the temperature of feedback stream 206. This allows maximizing the amount of CO2 that is in solid phase, hence optimizing the conditions for separation in the solid-liquid separator 202. Feedback stream 206 may be driven by a pump 2061.

Cooling duty for the direct contact heat exchanger 200 is obtained by a feedback stream 206 from the further cooling and separation of the multiphase stream 201, as will be explained in more detail below.

Controlling the flow rate may for instance be done by controlling the operating settings of the pump 2061.

The multiphase stream 201 is separated to obtain a CO2 depleted liquid stream 141 and a CO2 enriched slurry stream 140 (step (e)), and the CO2 depleted liquid stream 141 is further subjected to a pressure reduction, cooling and separation stage (step (f)), thereby obtaining a gaseous stream 190, a purified liquid stream 205 and a further CO2 enriched slurry stream 206.

The term pressure reduction, cooling and separation stage is used in this text in a way that doesn't necessarily imply cooling against a refrigerant, but may include cooling by expansion and/or cooling against itself (i.e. as explained in more detail with reference to FIGS. 1b-c). The pressure reduction, cooling and separation stage may alternatively be referred to as a pressure reduction and separation stage.

The further CO2 enriched slurry stream 206 is used to provide solid CO2 particles on which dissolved CO2 can freeze out thus forming larger CO2 particles, as well as act as cooling duty to the direct contact heat exchanger 200 (step (g)).

The concentrated slurry stream 140 may be further processed if desired; typically, it is a $CO_2$-rich stream. Preferably, the concentrated slurry stream 140 is heated in slurry heater 12 and separated into a liquid phase 160 and a gaseous phase 150; the gaseous phase 150 may be combined with a fuel gas stream (schematically shown in FIG. 1a).

The use of a direct contact heat exchanger 200 results in larger CO2 particles in the multiphase stream 201 that is obtained in the direct contact heat exchanger 201 (step d) and passed to the solid-liquid separator 202 (step e).

Additionally, other contaminants, such as water and heave hydrocarbons, will also freeze out in the direct contact heat exchanger 200. Traces of these other contaminants may still be present in the top stream 60 obtained from the methanol separator 17 and are also effectively removed.

Consequently, the method has the advantage that contaminated hydrocarbon-containing gas streams can be processed having a CO2 content of more than 2 mol %, more than 5 mol % or even up to 10 mol %. A further advantage is that larger CO2 particles are formed, which are easier separated.

The streams being passed through the direct contact heat exchanger 200 will experience shear forces that are considerably smaller than shear forces experienced by a stream passing through a Joule Thomson valve or similar expansion device.

According to an embodiment the solid phase of the multiphase stream 201 obtained in step (d) contains CO2 particles with an average size greater than 50 micron, preferably greater than 100 micron, more preferably greater than 200 micron or greater than 350 micron.

Typically, the average size is in the range of 100-500 micron. This contributes to an easier and improved separation in step f.

According to an embodiment the residence time of molecules forming the liquid stream 90 obtained in step (c) and molecules forming the at least part of the further CO2 enriched slurry stream 206 obtained in step (f) in the direct contact heat exchanger 200 is greater than 10 seconds.

Preferably, the residence time is more than 30 seconds. More preferably the residence time is in the range of 10-60 seconds.

The residence time is defined as the average time it takes a molecule of the liquid stream 90 obtained in step (c) to travel through the direct contact heat exchanger 200.

The relatively long residence time of the molecules allows further crystallization and growth of the CO2 particles contained by the multiphase stream 201.

According to an embodiment the temperature of the multiphase stream 201 obtained in step (d) is more than 10° C. below the CO2 frost point. The frost point is defined as the temperature at which the first solid CO2 is formed at a given CO2 mol fraction and a given pressure. So, the CO2 frost point is the CO2 frost point associated with the operating conditions of the direct contact heat exchanger 200, i.e. associated with the CO2 mol fraction.

The multiphase stream 201 may comprise a CO2 fraction in the range of 0.01 mol %-20 mol % CO2.

FIG. 2 schematically depicts a frost line diagram for a binary mixture of CO2 and methane. The skilled person will be able to determine the frost temperature for a given multiphase stream.

The temperature of the multiphase stream 201 may be in the range of minus 110° C.-minus 160° C., e.g. minus 135° C. at a pressure in the range of 4-16 bar, preferably in the range of 8-12 bar, e.g. 10 bar. This has the effect that the multiphase stream 201 doesn't comprise a vapour phase or only a relatively small vapour phase portion that could disturb the crystallization and growth process of the CO2 particles contained by the multiphase stream 201.

According to an embodiment the at least part of the further CO2 enriched slurry stream 206 passed to the direct contact heat exchanger 200 in step (g) comprises CO2 particles that function as seed particles in the direct contact heat exchanger 200.

The CO2 particles contained in the at least part of the further CO2 enriched slurry stream may have an average size in the range of 100-300 micron.

The seed particles initiate and accelerate the growth of CO2 particles contained by the multiphase stream 201 resulting in larger CO2 particles in the multiphase stream 201 which can be separated relatively easy.

According to an embodiment the pressure and temperature in the direct contact heat exchanger 200 are selected such that vapour phase, liquid phase and solid phase are present simultaneously.

This is advantageous as the optimal conditions for a feed stream with given CO2 mol fraction occur for a pressure and temperature where vapour/liquid/solid are present (rather than a liquid/solid regime). This allows achieving freeze out (at approx. 25° C.) higher temperature and/or reaching a deeper CO2 separation. This optimizes the separation process.

The solid/liquid separator 202 may be any suitable solid/liquid separator.

The vapour may be vented from the direct contact heat exchanger 200 via a venting line 191 which connects the direct contact heat exchanger 200 with gaseous stream 190 obtained in step (f) or separator 204 as used in step (f). Both options are shown by a dashed line in FIG. 1a.

According to an embodiment the solid-liquid separator 202 of step (e) comprises one or more cyclone separators, one or more filters or one or more gravity based settling vessels.

One or more serial and/or parallel cyclone separators may be used. In a cyclone separator, the stream is brought into a swirling motion such that the heavier components are forced outwardly and are at least partially separated from the lighter components to form the CO2 enriched slurry stream (140; heavier components) and the CO2 depleted liquid stream (141; lighter components). Any suitable type of cyclone separator may be used and swirling motion can be generated using tangential inlet or an in-line cyclone where swirl is generated using internals.

One or more serial and/or parallel gravity based settling vessels may be used in which the multiphase stream 201 can be introduced and be provided with sufficient residence time to allow the heavier components to settle and obtain the CO2 enriched slurry stream 140 as bottom stream.

According to an embodiment step (f) comprises
(f1) passing the CO2 depleted liquid stream 141 over a pressure reduction device, such as a Joule Thomson valve 203 and into a separator 204,
(f2) obtaining the gaseous stream 190 as top stream from the separator 204 and obtaining a further multiphase stream 208 as bottom stream from the separator 204, the further multiphase stream 208 containing at least a liquid phase and a solid phase, the solid phase containing CO2 particles;
(f3) separating the further multiphase stream 208 in a further solid-liquid separator 209 thereby obtaining the purified liquid stream 205 and the further CO2 enriched slurry stream 206.

The separator 204 may be a cyclonic separator or a gravity based separator.

The further solid-liquid separator 209 may comprise one or more cyclonic separators arranged in parallel or one or more gravity based settling vessels.

The gaseous stream 190 may have a pressure of 1 to 10 bar.

According to an embodiment, the method comprises (h) passing the purified liquid stream 205 to an end flash stage obtaining an end flash gas stream 271 and a liquid natural gas stream 170.

The end flash stage comprises valve 2051 and the end flash vessel 207 and produces an end flash gas stream 271 and a liquid natural gas stream 170 as bottom stream.

The liquid natural gas stream 170 is suitable for storage in a LNG storage tank 11, preferably at or close to atmospheric pressure (e.g. in the range of 1-1.2 bar).

As shown in the figures, a boil-off gas stream 180 is obtained from the LNG storage tank 11.

According to an embodiment part of the liquid natural gas stream 170 is fed back to the cooling, pressure reduction and separation stage of step (f) to provide cooling duty to the CO2 depleted liquid stream 141. In particular, cooling duty is provided to the further multiphase stream 208 (obtained in step f2). Cooling duty from the liquid natural gas stream 170 can advantageous be used. This can be embodied in different manners, examples of which are provided in FIGS. 1b-1c.

According to the embodiments shown in FIGS. 1b and 1c, a further recycle conduit 171 arranged to carry a further recycle stream, obtained as split stream from the liquid natural gas stream 170, is provided in between an end flash vessel 207 and the LNG storage tank 11. However, alternatively, recycle stream 171 can be obtained from the LNG storage tank 11 directly.

The advantage of the embodiment in FIG. 1b is that the further recycle stream 171 (which has a temperature of about −161° C.) reduces the temperature in further solid-liquid separator 209, hence creates more severe CO2 freezing conditions which improves the formation of solid CO2 and improves the separation of CO2 in further solid-liquid separator 209.

According to an embodiment part the liquid natural gas stream 170 is mixed with the further multiphase stream 208 obtained in step (f2) upstream of the further solid-liquid separator 209 of step (f3).

FIG. 1b schematically depicts an embodiment in which mixing is done by adding recycle stream 171 to the further multiphase stream 208, e.g. by means of a combiner.

According to an embodiment mixing of the liquid natural gas stream 171 and the further multiphase stream 208 is done in a further direct contact heat exchanger 211.

This provides an efficient manner of obtaining a partially liquefied stream from a contaminated hydrocarbon-containing gas stream.

This embodiment is shown in FIG. 1c and has the advantage that further recycle stream 171 (which has a temperature of about −161 C) reduces the temperature in further direct contact heat exchanger 211, hence creates more severe CO2 freezing conditions and the residence time in further direct contact heat exchanger 211 allows for further growth of CO2 solids, which further improves the separation of CO2 in further solid-liquid separator 209. Pump 1711 may be provided to transport the recycle stream 171.

The gaseous stream 80 obtained in separator 5 separating the partially liquefied stream 70 to obtain a gaseous stream 80 and a liquid stream 90 in step c, is passed through the first heat exchanger 3 thereby obtaining a heated gaseous stream 270; if desired some inerts (such as $N_2$) may be removed from the heated gaseous stream 270 as (minor) stream 280. As stream 80 is used to cool the stream 30, this is an "auto-refrigeration" step.

The heated gaseous stream 270 is compressed in compressor 13 thereby obtaining a compressed gas stream 220. Part 230 of the compressed gas stream 220 is combined with the contaminated hydrocarbon-containing gas stream 20.

As can be seen in the embodiments shown, a part 240 of the compressed gas stream 220 is passed through the second heat exchanger 15 (and cooled therein) thereby obtaining a cooled compressed gas stream 250. The cooled compressed gas stream 250 is expanded in expander 16 thereby obtaining an expanded gas stream 260. Subsequently, the expanded gas stream 260 is combined with the gaseous stream 80 to form stream 265.

Furthermore, the gaseous stream 190 obtained in step (f) in the further cooling, pressure reduction and separation stage is passed through the second heat exchanger 15 thereby obtaining a second heated gaseous stream 274. The second heated gaseous stream 274 is compressed in compressor 14 thereby obtaining a second compressed gas stream 210; this second compressed gas stream 210 is combined with the heated gaseous stream 270 (to form stream 215).

So, according to an embodiment, the method comprises
(i) passing the gaseous stream 80 obtained in step (c) through the first heat exchanger 3 thereby obtaining a heated gaseous stream 270; and
(j) compressing the heated gaseous stream 270 thereby obtaining a compressed gas stream 220; and
(k) combining the compressed gas stream 220 obtained in step (j) with the contaminated hydrocarbon-containing gas stream 20 provided in step (a).

According to an embodiment, the method further comprises: cooling a part 240 of the compressed gas stream 220 obtained in step (j) through a second heat exchanger 15 thereby obtaining a cooled compressed gas stream 250; expanding the cooled compressed gas stream 250 thereby obtaining an expanded an expanded gas stream 260; and combining the expanded gas stream 260 with the gaseous stream 80 obtained in step (c).

So, according to an embodiment the method comprises: passing the gaseous stream 190 obtained in step (f) through the second heat exchanger 15 thereby obtaining a second heated gaseous stream 274; compressing the second heated gaseous stream 274 thereby obtaining a second compressed gas stream 210; and combining the second compressed gas stream 210 with the heated gaseous stream 270 obtained in step (i).

According to a further embodiment the method comprises compressing an end gas stream 181, comprising the end flash gas stream 271 and optionally the boil-off gas stream 180 by a compressor 272 to obtain an end compressed end flash gas stream 273, and combining the compressed end flash gas stream 273 with the second heated gaseous stream 274 to be compressed in compressor 14 thereby obtaining the second compressed gas stream 210.

The compressed end flash gas stream 273 may be at a pressure that allows combining with second heated gaseous stream 274, e.g. approximately 4 bar. The second compressed gas stream 210 may be at a pressure of 20 bar.

As shown in FIGS. 1a-1c, the liquid hydrocarbon stream 170 obtained in step (g) is stored in a LNG storage tank 11, and the boil-off gas stream 180 obtained from said storage tank 11 is combined with the end flash gas stream 271 obtained in step (h).

The person skilled in the art will readily understand that many modifications may be made without departing from the scope of the invention. For instance, where the word step or steps is used it will be understood that this is not done to imply a specific order. The steps may be applied in any suitable order, including simultaneously.

That which is claimed is:

1. A method of liquefying a contaminated hydrocarbon-containing gas stream, the method comprising at least the steps of:
   (a) providing a contaminated hydrocarbon-containing gas stream having a contaminant being carbon dioxide ($CO_2$);
   (b) cooling the contaminated hydrocarbon-containing gas stream to produce a partially liquefied stream;
   (c) separating the partially liquefied stream in a separator thereby producing a gaseous stream and a liquid stream;
   (d) cooling the liquid stream produced in step (c) by passing the liquid stream to a direct contact heat exchanger thereby producing a multiphase stream, the multiphase stream containing at least a liquid phase and a solid phase, the solid phase containing $CO_2$ particles;
   (e) separating the multiphase stream in a solid-liquid separator thereby producing a $CO_2$ depleted liquid stream and a first $CO_2$ enriched slurry stream;
   (f) passing the $CO_2$ depleted liquid stream to a cooling, pressure reduction, and separation stage, the cooling, pressure reduction and separation stage generating a gaseous stream, a purified liquid stream, and a second $CO_2$ enriched slurry stream;
   (g) passing at least part of the second $CO_2$ enriched slurry stream to the direct contact heat exchanger to provide cooling duty to and mix with the liquid stream produced in step (c).

2. The method according to claim 1, wherein the solid phase of the multiphase stream produced in step (d) contains $CO_2$ particles with an average diameter greater than 50 micron.

3. The method according to claim 1, wherein molecules forming the liquid stream produced in step (c) and molecules forming the at least part of the second $CO_2$ enriched slurry stream produced in step (f) in the direct contact heat exchanger have residence times greater than 10 seconds.

4. The method according to claim 1, wherein the passing the liquid stream produced in step (c) to the direct contact heat exchanger comprises passing the liquid stream over a pressure reduction device.

5. The method according to claim 1, wherein a pressure and a temperature in the direct contact heat exchanger are selected so that a vapor phase, a liquid phase and a solid phase are present simultaneously.

6. The method according to claim 1, wherein the solid-liquid separator of step (e) comprises one or more cyclone separators, one or more filters, or one or more gravity based settling vessels.

7. The method according to claim 1, wherein the passing the $CO_2$ depleted liquid stream to the cooling, pressure reduction, and separation stage of step (f) comprises:
   (f1) passing the $CO_2$ depleted liquid stream over a pressure reduction device and into a separator,
   and wherein the generating of step (f) comprises:
   (f2) producing the gaseous stream as a top stream from the separator and producing a different multiphase stream as a bottom stream from the separator, the different multiphase stream containing at least a liquid phase and a solid phase, the solid phase containing $CO_2$ particles,
   (f3) separating the different multiphase stream in a different solid-liquid separator thereby producing the purified liquid stream and the second $CO_2$ enriched slurry stream.

8. The method according to claim 7, wherein the pressure reduction device is a Joule Thomson valve.

9. The method according to claim 1 further comprising:
   (h) passing the purified liquid stream to an end flash stage producing an end flash gas stream and a liquid natural gas stream.

10. The method according to claim 9, wherein a portion of the liquid natural gas stream is fed back to the cooling, pressure reduction and separation stage of step (f) to provide cooling duty to the $CO_2$ depleted liquid stream.

11. The method according to claim 10, wherein the portion of the liquid natural gas stream is mixed with the different multiphase stream produced in step (f2) upstream of the different solid-liquid separator of step (f3).

12. The method according to claim 11, wherein mixing of the portion of the liquid natural gas stream and the different multiphase stream is done in a different direct contact heat exchanger.

13. The method according to claim 1, wherein the cooling of step (b) comprises:
   (b1) cooling the contaminated hydrocarbon-containing gas stream in a first heat exchanger thereby producing a cooled contaminated hydrocarbon-containing stream,
   (b2) cooling the cooled contaminated hydrocarbon-containing stream in an expander thereby producing the partially liquefied stream.

14. The method according to claim 1, wherein the solid phase of the multiphase stream produced in step (d) contains $CO_2$ particles with an average diameter greater than 100 micron.

15. The method according to claim 1, wherein the solid phase of the multiphase stream produced in step (d) contains $CO_2$ particles with an average diameter greater than 350 micron.

16. A system for liquefying a contaminated hydrocarbon-containing gas stream, the system comprising:
 (a) a feed conduit arranged to provide a contaminated hydrocarbon-containing gas stream-having a contaminant being carbon dioxide ($CO_2$);
 (b) a cooling stage arranged to receive the contaminated hydrocarbon-containing gas stream and discharge a partially liquefied stream;
 (c) a separator arranged to receive the partially liquefied stream and to discharge a gaseous stream and a liquid stream;
 (d) a direct contact heat exchanger arranged to receive and cool the liquid stream produced in step (c) to produce a multiphase stream, the multiphase stream containing at least a liquid phase and a solid phase, the solid phase containing $CO_2$ particles;
 (e) a solid-liquid separator arranged to receive the multiphase stream and discharge a $CO_2$ depleted liquid stream and a $CO_2$ enriched slurry stream;
 (f) a cooling, pressure reduction and separation stage arranged to receive the $CO_2$ depleted liquid stream and generate a gaseous stream, a purified liquid stream and a second $CO_2$ enriched slurry stream;
 (g) a recycle conduit which is arranged to pass at least part of the second $CO_2$ enriched slurry stream comprising solid $CO_2$ particles to the direct contact heat exchanger to provide cooling duty to and mix with the liquid stream produced by the separator.

* * * * *